(12) United States Patent
Pineault

(10) Patent No.: US 6,319,532 B1
(45) Date of Patent: Nov. 20, 2001

(54) METHOD AND TOOLING FOR FOOD EXTRUSION

(76) Inventor: Marcel Pineault, 12360, rue Saint-Evariste, Montreal, QBC (CA), H4J 2B7

( * ) Notice: Subject to any disclaimer, the term of this patent is extended or adjusted under 35 U.S.C. 154(b) by 0 days.

(21) Appl. No.: 09/695,333

(22) Filed: Oct. 25, 2000

(30) Foreign Application Priority Data

Oct. 25, 1999 (CA) ................................................... 2288170

(51) Int. Cl.⁷ .............................. A23P 1/00; B01F 15/00; B29C 47/00
(52) U.S. Cl. .......................... 426/516; 222/386; 222/409; 425/376.1; 426/519
(58) Field of Search .................................. 426/516, 519; 425/190, 376.1; 222/386, 409

(56) References Cited

U.S. PATENT DOCUMENTS

| | | |
|---|---|---|
| 4,668,561 | 5/1987 | Ney . |
| 4,861,255 | 8/1989 | Ney . |
| 4,881,663 | 11/1989 | Seymour . |
| 4,951,848 * | 8/1990 | Keller ................................... 222/386 |
| 5,020,698 | 6/1991 | Crossley . |
| 5,208,050 | 5/1993 | Ney . |
| 5,743,640 | 4/1998 | Crossley . |
| 5,820,892 | 10/1998 | Laver et al. . |
| 5,993,188 * | 11/1999 | Mak ................................... 425/376.1 |

* cited by examiner

*Primary Examiner*—George C. Yeung

(57) ABSTRACT

A method for food extrusion comprising the steps of: a) releasably installing an extrusion container having generally elliptically shaped open cavity with a frustro-conical shaped bottom terminated by a circular outlet on a base plate of an extrusion assembly; b) placing a food product to fill the cavity of the extrusion container, the food product including at least one soft constituent such as soft ice cream and the like; c) activating an elliptically frustro-conical shaped piston via a manual arm by applying pressure on the piston to downwardly push the food product contained in the cavity of the extrusion container, the piston being coaxial to the cavity and adapted to slidably engage the same; d) extruding the food product by providing circular downward flowing of the same with variable speed through the cavity down to the outlet of the extrusion container while performing a blending of air into the food product and twisting of the same; and e) collecting the food product being extruded from the container into a receiving receptacle with optimal stiffness, texture, density, feel and taste. Preferably, the food product includes at least two soft constituents placed adjacent to each other within the cavity.

17 Claims, 4 Drawing Sheets

METHOD AND TOOLING FOR FOOD EXTRUSION

FIELD OF THE INVENTION

The present invention relates to a method and a tooling for preparation of an extruded food confection. More particularly, it relates to a method and an associated tooling permitting the preparation of extruded food confections comprising at least two soft constituents made of different substances and flavors and possibly a centre core made of solid ingredients as a fresh fruit, smarties, chocolate, caramel, crumbled coffee crisp, and the like.

BACKGROUND OF THE INVENTION

The confection of hard or soft ice cream and frozen yogurt deserts has become very popular in the past years. More recently, some attempts have been made to offer soft serve ice cream in a large selection of flavors as is available for hard frozen ice cream and frozen yogurt, but with very limited success. Indeed, the addition of fruits or liquid flavoring tends to increase the temperature and density of the product. This has no significant drawbacks for hard ice cream since the product is cooled after preparation and the initial air content, usually higher than for soft ice cream, can be adjusted accordingly in the initial steps of the preparation process. Similarly, a yogurt based frozen confection is prepared from hard and frozen portions to which fruits or concentrated flavors are incorporated by mixing. The average temperature and air content (overrun) are thus increased with respect to the base hard frozen product. To obtain a soft mixture with the expected texture and consistence that mixture is then extruded from the mixing chamber to form the final product. Such a process is accomplished by a homogenization or yogurt machine with combined chopping, mixing and extruding functions of the type described in U.S. Pat. No. 4,668,561 (Ney, 1987), No. 4,861,255 (Ney, 1989) and 5,208,050 (Ney, 1993). It is also known to use such an apparatus to prepare a serving of flavored soft ice cream from a serving of hard ice cream with addition of fruits, liquid flavoring, nuts and the like.

A recent attempt to widen the spectrum of available flavors for the preparation of stripped or twisted confections is described in U.S. Pat. No. 5,743,640 (Crossley, 1998).

Experience with this type of equipment tends to prove poor performance, the prepared confections being small, compact and rapidly melting for a given weight of ice cream. These confections cannot be dipped in coatings such as chocolate, caramel, nuts or candies.

From that survey of above methods and equipment of the prior art, it becomes obvious that they fail at responding to the market need for a soft ice cream confection of good quality in a plurality of custom selectable flavors in a simple and economical manner.

The limitation of the prior art is that the current state of the art is far from permitting of a striped soft ice cream confection incorporating two or more custom prepared flavors, with the possibility of adding solid or high density ingredients to the individual flavored ice cream streams or hidden in the centre of the confection.

OBJECTS OF THE INVENTION

It is a general object of the present invention to provide a method and tooling for food extrusion of soft serve ice cream confections, which overcomes the limitations and drawbacks of the above mentioned solutions of the prior art.

Another object of the present invention is to provide a method and tooling for food extrusion permitting the preparation of multi flavored striped or twisted soft serve ice cream, ice milk or frozen yogurt confections made from different streams of custom mixed soft serve ice cream base.

A further object of the present invention is to provide a method and tooling for food extrusion permitting the preparation of a soft serve ice cream product with optimal texture, temperature and air content parameters thus permitting the food product to further be manipulated as for highly sought after chocolate, caramel or candy coating.

Still another object of the present invention is to provide a method and tooling for food extrusion permitting the preparation of stripped or twisted soft serve ice cream or other food product confection comprising an inner core of solid ingredients incorporated into one or more of the ice cream streams extruded.

Still a further object of the present invention is to provide a method and tooling for food extrusion permitting the preparation of stripped or twisted soft serve ice cream or other food product confection comprising an inner core of viscous liquid product such as fudge, honey caramel or the like.

Yet another object of the present invention is to provide a method and tooling for food product extrusion permitting the preparation of stripped or twisted soft serve ice cream or other food confection having optimal air content, temperature and density parameters after the incorporation of an unlimited combination of flavored syrups or solid ingredients.

Else an object of the present invention is to provide a method and tooling for food extrusion permitting the preparation of stripped or twisted food confections economically with a few basic pieces of equipment and with minimal cleaning requirements.

Still a further object of the present invention is to provide a method and tooling for food extrusion that is safe to use, compatible with currently available machines, easy to assemble, and relatively inexpensive to manufacture and maintain.

Other objects and advantages of the present invention will become apparent from a careful reading of the detailed description provided herein, with appropriate reference to the accompanying drawings.

SUMMARY OF THE INVENTION

According to one aspect of the present invention, there is provided a method and tooling for food extrusion method for food extrusion comprising the steps of:

a) releasably installing an extrusion container having generally elliptically shaped open cavity with a frustro-conical shaped bottom terminated by a circular outlet on a base plate of an extrusion assembly;

b) placing a food product to fill the cavity of the extrusion container, said food product including at least one soft constituent;

c) activating an elliptically frustro-conical shaped piston via a manual arm by applying pressure on the piston to downwardly push the food product contained in the cavity of the extrusion container, said piston being coaxial to the cavity and adapted to slidably engage the same;

d) extruding the food product by providing circular downward flowing of the same with variable speed through the cavity down to the outlet of the extrusion container while performing a blending of air into the food product and twisting of the same;

e) collecting the food product being extruded from the container into a receiving receptacle.

Preferably, the piston includes a sealing member to provide a seal between the same and said container thus preventing said food product to back flow therebetween.

Preferably, the method for food extrusion further comprises, after step b), the following step:

b') placing a sheet like material over the container to close the cavity, said material is slightly stretchable and resistant to tear under stress.

Preferably, the food product includes at least two soft constituents, said constituents placed adjacent to each other within the cavity and said food product further includes at least one solid ingredient or includes at least two soft constituents, said constituents placed adjacent to each other within the cavity.

Preferably, the food product further includes at least one solid ingredient.

Preferably, step b) of the method further includes locating the solid ingredient at a substantially central region of the cavity.

Preferably, the soft constituents are different flavors of an ice cream.

According to the second aspect of the present invention, there is provided a tooling for food extrusion that comprises an extrusion container having a generally elliptically shaped open cavity with a frustro-conical shaped bottom terminated by a circular outlet and being removably secured on a base plate of an extrusion assembly, a piston having an elliptically frustro-conical shape, being coaxial to the cavity, being adapted to slidably engage the same. The cavity being adapted to be filled by a food product including at least one soft constituent, the food product being extruded from the cavity by the piston. The piston is activated via a manual arm by applying pressure on the same for downwardly pushing the food product contained into the cavity of the extrusion container and for providing circular downward flowing of the food product with variable speed through the cavity down to the outlet of the extrusion container while performing a blending of air into the food product and some twisting of the same, thereby extruding the food product with optimal stiffness, texture, density, feel and test.

Preferably, the piston has a sealing member for providing a seal between the same and the container thereby preventing the food product to back flow therebetween. The container has a sheet like material located over the same to close the cavity, said material being slightly stretchable and resistible to tear under a stress.

Preferably, the sealing member is of an elliptical shape and releasably secured to the piston, said member is adapted to be releasably engaged by an alignment device for aligning the same to the piston. The container has a peripheral notch and two parallel lateral grooves, said base plate has a rectangular hole and at least two retainers locating on an opposite sites of the hole being adapted for adjustably receiving the container. Preferably the container material helped by and its wall thickness, is a good insulating material from a surrounding air and from warming up said food.

Preferably, the food product includes at least two soft constituents, said constituents placed adjacent to each other within the cavity. The soft constituents are different flavors of an ice cream.

Preferably, the outlet includes a cross-sectional pattern at a lower extremity for providing an eye-attractive shape to the food product being extruded from the cavity.

BRIEF DESCRIPTION OF THE DRAWINGS

In the annexed drawings, like reference characters indicate like elements throughout.

DETAILED DESCRIPTION OF THE PREFERRED EMBODIMENT

Figure 1:
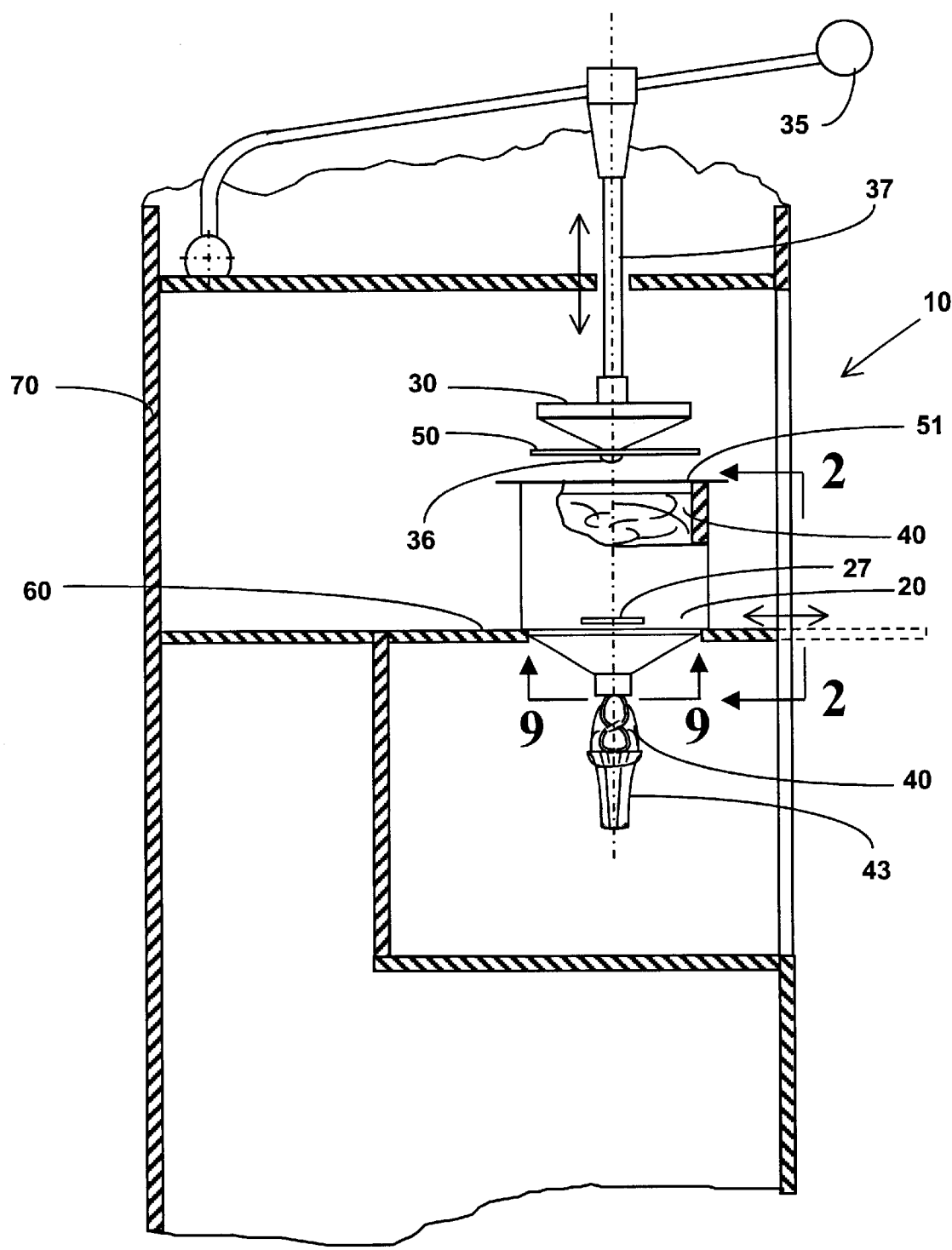
FIG. 1 is a cross-sectional view of an embodiment of the food extrusion device according to the present invention.
Figure 2:
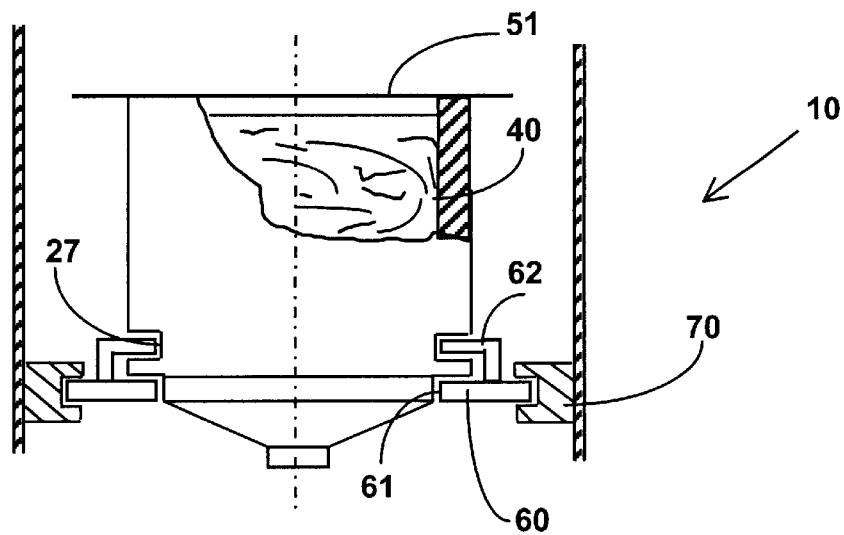
FIG. 2 is a side view taken along line 2—2 of FIG. 1.
Figure 3:
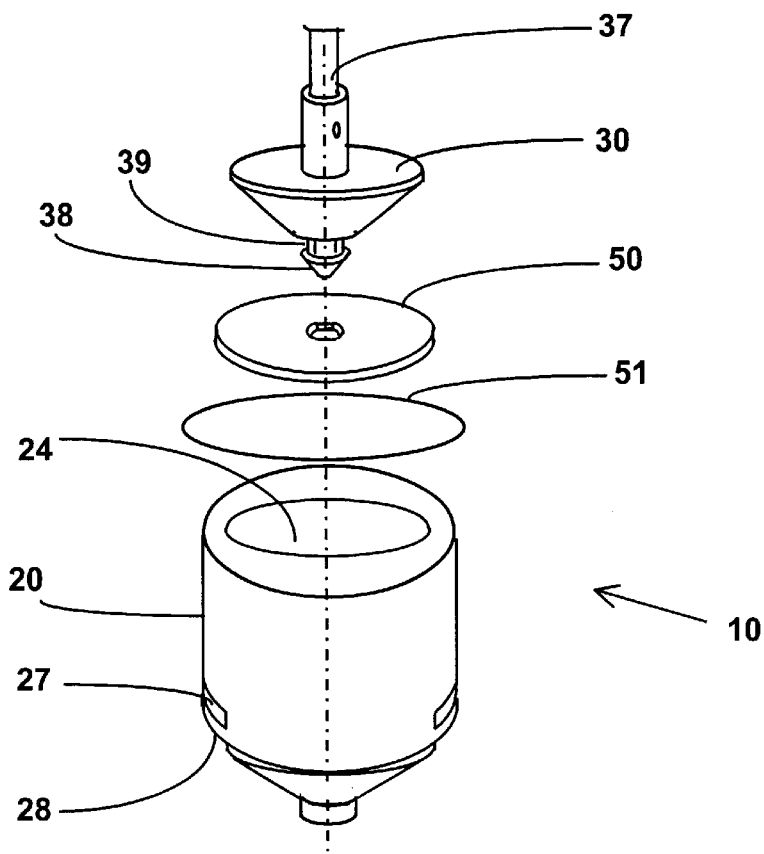
FIG. 3 is an exploded perspective view of the embodiment of FIG. 1.

With reference to the annexed drawings the preferred embodiment the present invention will be herein described for indicative purposes and by no means as of limitation.

With reference to FIGS. 1–9 there is illustrated a method for food 40 trusions comprising the steps of:

a) releasably installing an extrusion container 20 having generally liptically shaped open cavity 24 with a frustro-conical shaped bottom 23 erminated by a circular outlet 25 on a base plate 60 of an extrusion assembly 70;

b) placing a food product 40 to fill the cavity 24 of the extrusion container 20, said food product 40 including at least one soft constituent 41;

c) activating an elliptically frustro-conical shaped 32 piston 30 via a manual arm 35 by applying pressure on the piston 30 to downwardly push the food product 40 contained in the cavity 24 of the extrusion container 20, said piston 30 being coaxial to the cavity 24 and adapted to slidably engage the same;

d) extruding the food product 40 by providing circular downward flowing of the same with variable speed through the cavity 24 down to the outlet 25 of the extrusion container 20 while performing a blending of air into the food product 40 and twisting of the same; and e) collecting the food product 40 being extruded from the container 20 into a receiving receptacle 43 such as a cone or bowl, with optimal stiffness, texture, density, feel and taste.

The piston 30 includes a sealing member 50 to provide a seal between the same and the container 20 thus preventing said food product 40 to back flow therebetween.

The method for food 40 extrusion may comprises after step b), the following step:

b') placing a sheet like material 51 over the container 20 to close the cavity 24, that material 51 is slightly stretchable and resistant to tear under stress.

The food product 40 preferably includes at least two soft constituents 41 and may further include at least one solid ingredient 42. Preferably the food product 40 includes at least two soft constituents 41 that are placed adjacent to each other within the cavity 24, either side-by-side one above the other or one surrounding the other. Additionally, the food product 40 further includes at least one solid ingredient 42.

Therefore, step b) of the method for food 40 extrusion may further include locating the solid ingredient 42 at a substantially central region of the cavity 24, if desired. The soft constituents 41 are different flavors of an ice cream.

FIG. 1 shows a tooling for food 40 extrusion for realizing the above described method of food extrusion. Referring to FIGS. 2, 3, 4 and 5, the tooling for food 40 extrusion comprises an extrusion container 20 having a generally elliptically shaped open cavity 24 with a frustro-conical shaped bottom 23 terminated by a circular outlet 25 and removably secured on a base plate 60 of an extrusion assembly 70.

Figure 6:
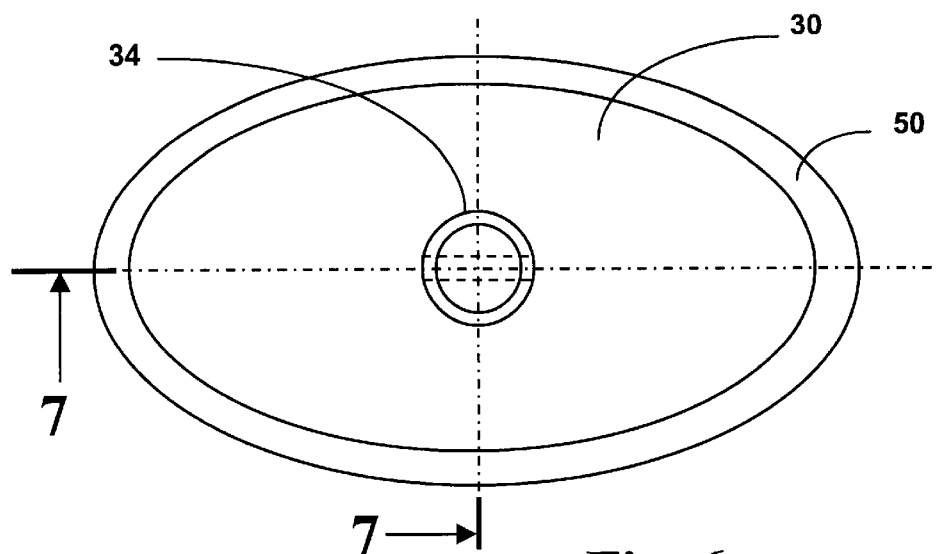
FIG. 6 is a top view of a piston with a sealing piece according to the present invention.
Figure 7:
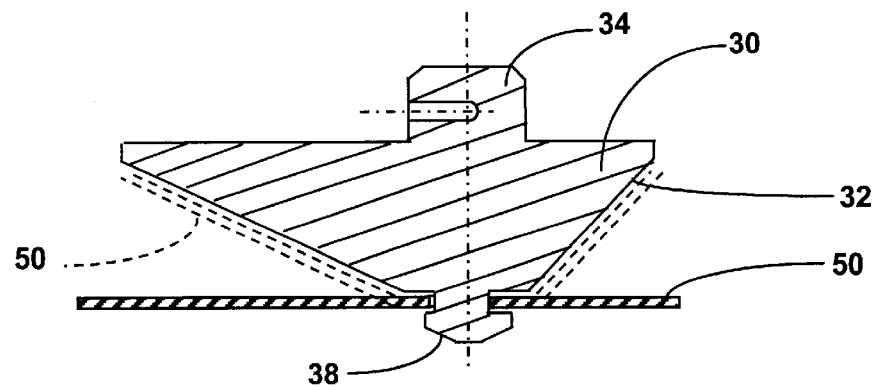
FIG. 7 is a cross-sectional view taken along line 7—7 of FIG. 6.
Figure 9:
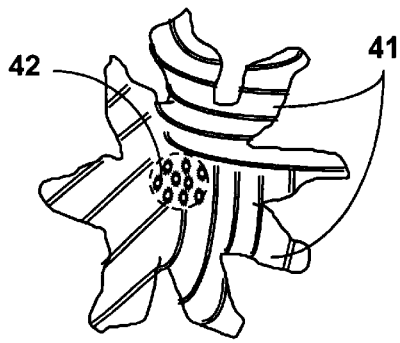
FIG. 9 is a cross-sectional view taken along line 9—9 of FIG. 1.
Figure 8:
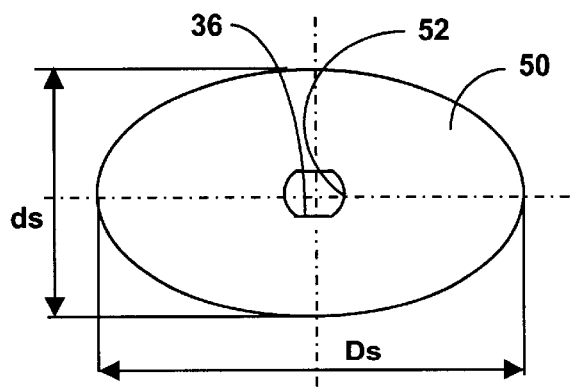
FIG. 8 is a top view of a sealing piece according to the present invention.

FIGS. 6, 7 and 8 show that piston 30 has an elliptically frustro-conical shape 32, being coaxial to the cavity 24, adapted to slidably engage the same. The cavity 24 is adapted to be filled by a food product 40 including at least one soft constituent 41. The food product 40 is extruded from the cavity 24 under the action of the piston 30, that is activated via a manual arm 35 by applying pressure on the same for downwardly pushing the food product 40 contained into the cavity 24 of the extrusion container 20 and for providing circular downward flowing of the food product 40 with variable speed through the cavity 24 due to the shape of the cavity, down to the outlet 25 of the extrusion container 20. While the food product flows down, a blending of air into the food product 40 is induced to increase its air content (overrun) and some twisting of the same, thereby extruding the food product 40 with optimal stiffness, texture, density, feel and taste.

Figure 4:
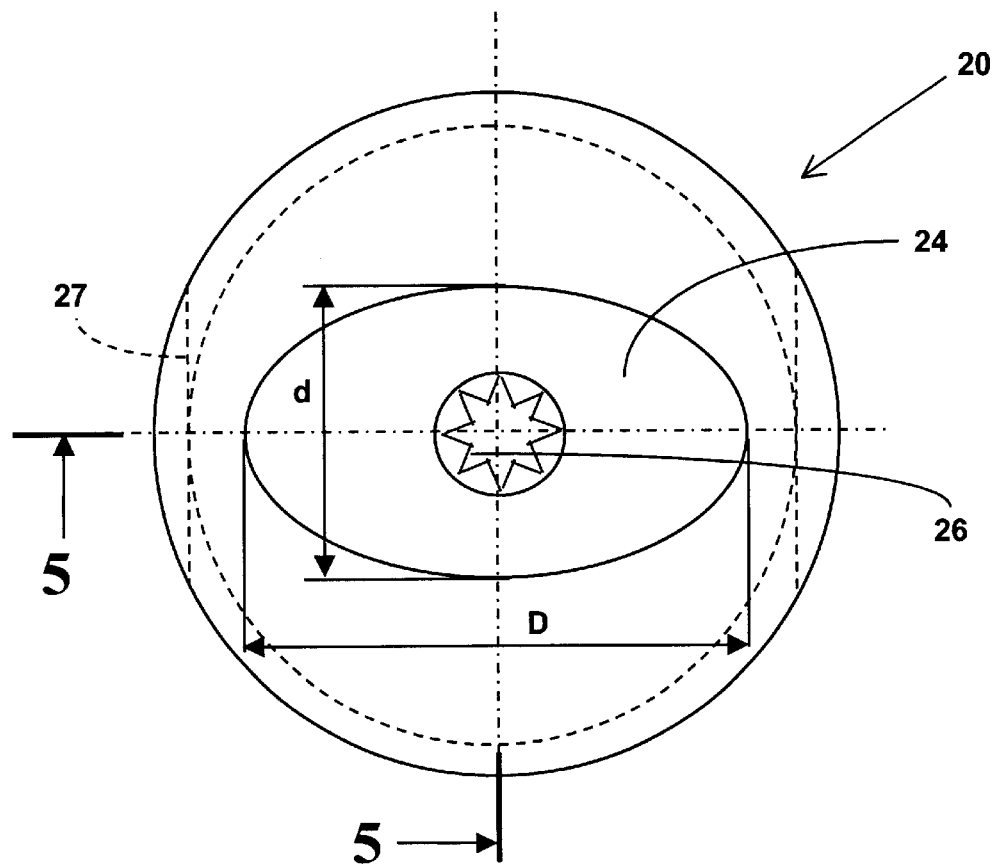
FIG. 4 is a top view of the extrusion container according to the present invention.
Figure 5:
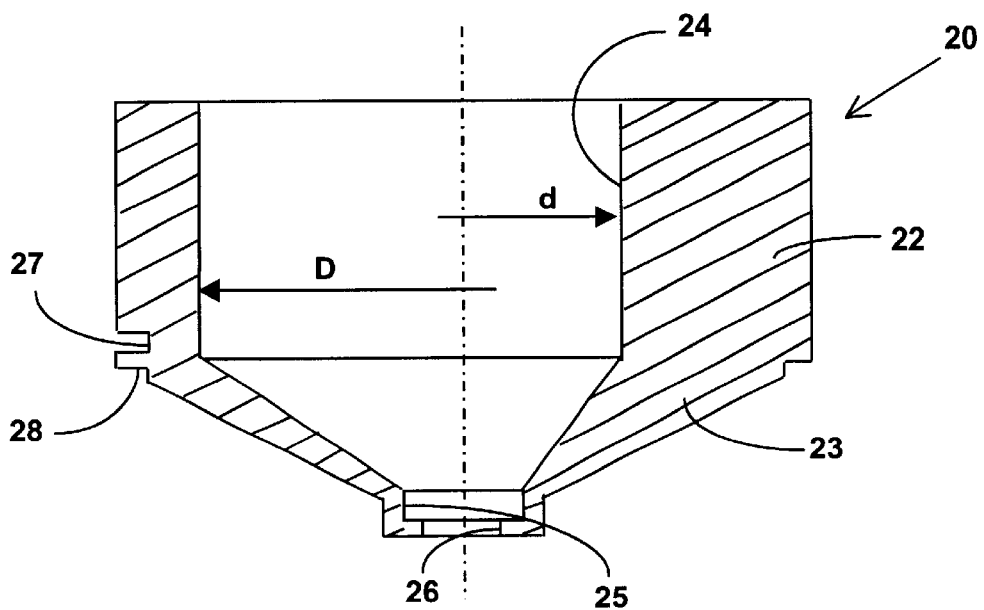
FIG. 5 is a cross-sectional view taken along line 5—5 of FIG. 4.

The piston 30 has a sealing member 50 for providing a seal between the same and the container 20 thereby preventing the food product 40 to back flow therebetween. Referring to FIGS. 4 and 8 the sealing piece 50 of the food extruder 10 preferably is made out of a rubber type material and has proper dimensions ($D_s$) and ($d_s$) for co-operating with dimensions (D) and (d) of the internal cavity 24 of the extrusion container 20, thereby for providing a desired level of sealing as well as keeping the air entrapped within the cavity available for blending and for preventing contamination of the piston 30 by the food product 40 or vice versa.

The internal cavity 24 of the tooling 10 for food extrusion preferably has a minor (d) and a major (D) axis dimension (FIG. 3) of 3.00 inches by 3.50 inches respectively with the corresponding sealing piece 50 having minor ($d_s$) and major ($D_s$) axis dimensions of 3.140 inches and 3.550 inches respectively.

To improve the sealing effect a thin plastic sheet like material 51 such as polyethylene covers the cavity 24 filled with food product 40. The sheet like material 51 is preferably slightly stretchable and resistant to tear under stress. It also prevents the piston 30 and its sealing member 50 from being contaminated by the food product 40, and than is ready for the next food extrusion without washing. Preferably, the material 51 is disposable and used only once, The sealing member 50 has an elliptical shape and is releasably secured to the piston 30. That member is adapted to be releasably engaged by an alignment device 36 for properly aligning the same to the piston 30. The alignment device is preferably a central slotted aperture, adapted to be releasably engaged by a flatten portion 39 on the lower free end 38 of the piston 30. The flatten portion 39 fitting into the aperture 52 for properly attaching the sealing piece 50.

The container has a supporting and a securing members, preferably made out of, respectively, a peripheral notch 28 and two parallel grooves 27. The base plate 60 has a substantially rectangular hole 61 and at least two retainers 62 located on opposite sides of the hole 61 and adapted for adjustably receiving the container 20 with the retainers 62 engaging their respective groove 27. The plate 60 is preferably slidably mounted into the extrusion assembly 70 to protrude out of the same for easy installation of the container 20 thereon, as shown in dashed lines in FIG. 1. The container 20 is preferably made out of a thermally insulating material thereby preventing warming up of the food product 40 inside the container 20. In order to help the thermal insulation of the container 20, its walls could also be preferably substantially thick.

Said food product 40 includes at least two soft constituents 41 are placed adjacent to each other within the cavity 24. Those soft constituents are different flavors of ice cream.

The outlet 25, of the container 20 preferably includes a cross-sectional pattern 26 at a lower extremity for providing an eye-attractive shape to the food product 40 being extruded from the cavity 24.

The tooling for food extrusion 10 according to the present invention can be used to extrude the different types of the food product 40 as soft ice cream, yogurt, ice milk, and the like, or an any combination of these.

Also the food product 40 can be made from two or more soft paste-like or puree food product confection such as mashed potatoes, vegetables or fruits, cookie paste and the like. The soft paste-like or puree food product may include some solid ingredients mixed in an of the paste-like ingredients stream.

It should further be noted that the elliptical shape of the internal cavity 24 of extrusion container 20 is so dimensioned to provide approximately the same cross-sectional area as a standard extrusion container thus maintaining approximately the same serving volume for a standard strike of the piston 30.

The particular shape of the inner cavity 24 provides two special functions. First, it contributes to perform the blending of air into the ice cream products 40 placed into the container 20. This is accomplished by the passage of the food product 40 from the elliptical cavity 24 to the circular dispensing outlet 25. The transition along the frustro-conical surface creates a difference in speed at different angular positions about the axis of the dispensing outlet 25 for a given advancing speed of the conical piston 30. Thus food particles travelling from the extremities of the long axis D, as seen in FIG. 4, are lagging with respect to those passing from the extremities of the short axis d since they must travel over a longer distance. This effect is amplified by the frustro-conical shape of the piston 30, which begins the cycle by applying pressure at the center of the food product 40. This design provides a whirl effect causing a relatively uniform blending of air into the food product 40 and some twisting of the constituents 41 within each other depending on their relative viscosity. This feature thus provides the desired uniform increase of the overrun in the ice cream products when they are maintained at an appropriate temperature range.

The second function provided by the elliptical shape of the extrusion container 20 and the frustro-conical piston 30 is the possibility of placing solid ingredients in the center of the cavity 24 to obtain an extruded food product confection 40 characterized by a hidden center core of solid ingredients 42. In a typical application, two or more portions of soft serve ice cream can be positioned along the longer axis of the cavity 24 in the elliptical extrusion container 20. Solid ingredients 42 such as nuts, cookies or chocolate flakes are placed at the center between the two elliptical long axes of the extrusion container 20. Optionally one may add a different flavored food confection as a top layer to the extrusion container 20. The food product confection 40 extruded will be a multi-flavored soft ice cream constituents 41 with a center core of solid ingredients 42 with perfect physical properties.

The tooling of the present invention is adopted for use on either manual or automatic extrusion machines.

The present method and tooling for food extrusion have been described with a certain degree of particularity. It is to be understood that the disclosure has been made by way of example only and that the present invention is not limited to the features of the embodiment described and illustrated herein, but includes all variations and modifications within the scope and spirit of the invention as hereinafter claimed.

I claim:

1. A method for food extrusion comprising the steps of:
   a) releasably installing an extrusion container having generally elliptically shaped open cavity with a frustro-conical shaped bottom terminated by a circular outlet on a base plate of an extrusion assembly;
   b) placing a food product to fill said cavity of said extrusion container, said food product including at least one soft constituent;
   c) activating an elliptically frustro-conical shaped piston via a manual arm by applying pressure on said piston to downwardly push said food product contained in said cavity of said extrusion container, said piston being coaxial to said cavity and slidably engaging said cavity;
   d) extruding said food product by providing circular downward flowing of said food product with variable speed through said cavity down to said outlet of said extrusion container while performing a blending of air into said food product and twisting of said food product; and
   e) collecting said food product being extruded from said container into a receiving receptacle.

2. The method for food extrusion as defined in claim 1, wherein said piston includes a sealing member to provide a seal between said piston and said container thus preventing said food product to back flow therebetween.

3. The method for food extrusion as defined in claim 2, further comprising, after step b), the following step:
   b') placing a sheet like material over said container to close said cavity, said material being slightly stretchable and resistant to tear under stress.

4. The method for food extrusion as defined in claim 1, wherein said food product including at least two soft constituents, said constituents being placed adjacent to each other within said cavity.

5. The method for food extrusion as defined in claim 1, wherein said food product further including at least one solid ingredient.

6. The method for food extrusion as defined in claim 3, wherein said food product including at least two soft constituents, said constituents being placed adjacent to each other within said cavity.

7. The method for food extrusion as defined in claim 6, wherein said food product further including at least one solid ingredient.

8. The method for food extrusion as defined in claim 7, wherein step b) of said method further includes locating said solid ingredient at a substantially central region of said cavity.

9. The method for food extrusion as defined in claim 6, wherein said soft constituents being different flavors of ice cream.

10. A tooling for food extrusion comprising an extrusion container having a generally elliptically shaped open cavity with a frustro-conical shaped bottom terminated by a circular outlet and being removably secured on a base plate of an extrusion assembly, a piston having an elliptically frustro-conical shape, being coaxial to said cavity and slidably engaging said cavity, said cavity being filled with a food product including at least one soft constituent, said food product being extruded from said cavity by said piston, said piston being activated via a manual arm by applying pressure on said piston for downwardly pushing said food product contained into said cavity of said extrusion container and for providing circular downward flowing of said food product with variable speed through said cavity down to said outlet of said extrusion container while performing a blending of air into said food product and twisting of said food product.

11. The tooling for food extrusion as defined in claim 10, wherein said piston having a sealing member for providing a seal between said piston and said container thereby preventing said food product to back flow therebetween during extrusion.

12. The tooling for food extrusion as defined in claim 11, wherein said container having a sheet like material located over said container to close said cavity, said material being slightly stretchable and resistible to tear under stress.

13. The tooling for food extrusion as defined in claim 11, wherein said sealing member being of an elliptical shape and releasably secured to said piston, said member being releasably engaged by an alignment device for aligning the same to said piston.

14. The tooling for food extrusion as defined in claim 10, wherein said container having a peripheral notch and two lateral grooves parallel to each other, said base plate having a substantially rectangular hole and at least two retainers located on opposite sides of said hole and adjustably receiving said container with said retainers engaging their respective corresponding of said grooves.

15. The tooling for food extrusion as defined in claim 10, wherein said container being made out of a thermally insulating material thereby preventing warming up of said food product inside said container.

16. The tooling for food extrusion as defined in claim 10, wherein said food product including at least two soft constituents, said constituents being placed adjacent to each other within said cavity.

17. The tooling for food extrusion as defined in claim 10, wherein said outlet including a cross-sectional pattern at a lower extremity for providing an eye-attractive shape to said food product being extruded from said cavity.

* * * * *